Feb. 26, 1952

H. G. BUSIGNIES 2,586,783

PROJECTILE RADIO LOCATION SYSTEM

Original Filed May 15, 1943

INVENTOR
HENRI G. BUSIGNIES

BY
ATTORNEY

Feb. 26, 1952      H. G. BUSIGNIES      2,586,783
PROJECTILE RADIO LOCATION SYSTEM
Original Filed May 15, 1943      2 SHEETS—SHEET 2
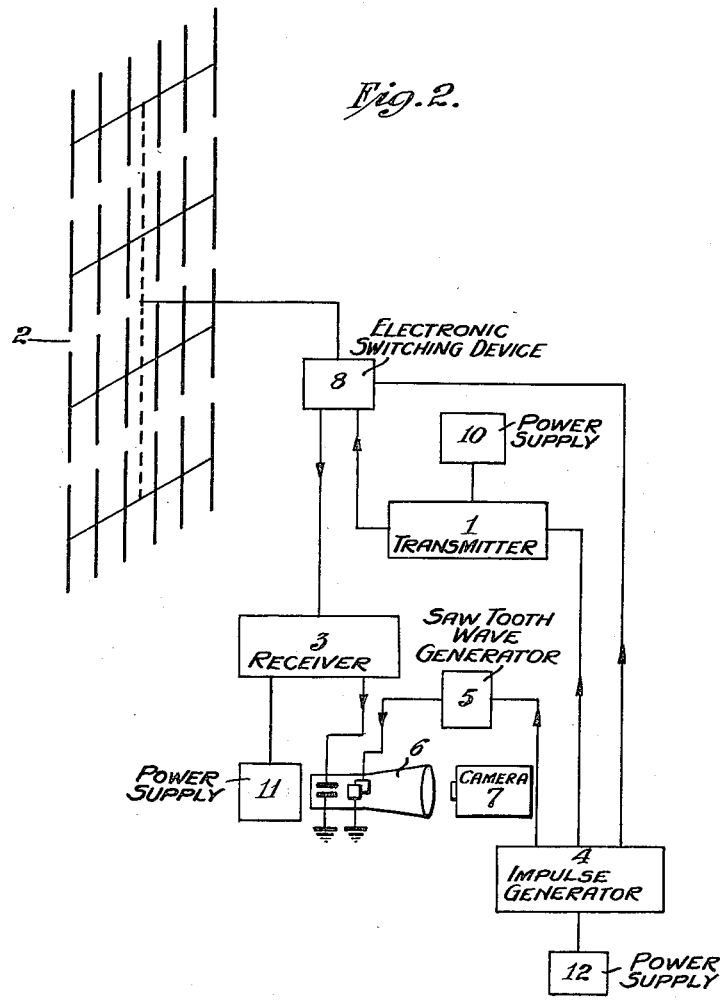
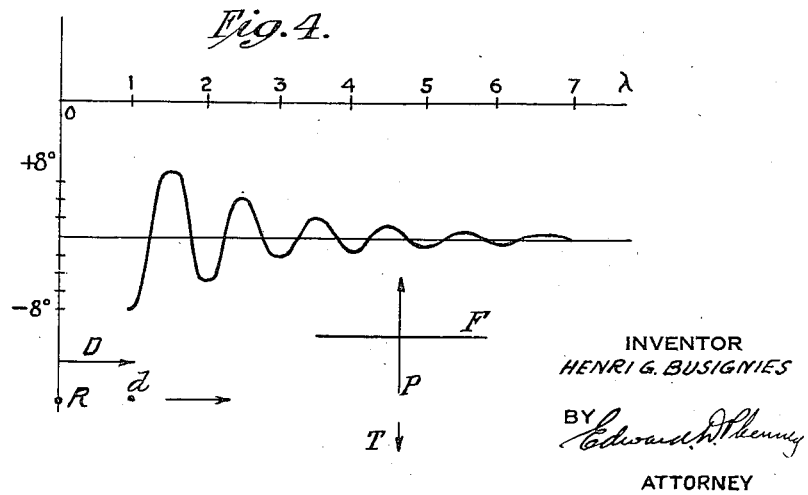
INVENTOR
HENRI G. BUSIGNIES
BY
ATTORNEY Patented Feb. 26, 1952

2,586,783

UNITED STATES PATENT OFFICE 2,586,783

PROJECTILE RADIO LOCATION SYSTEM

Henri Gaston Busignies, Forest Hills, N. Y., assignor to International Standard Electric Corporation, New York, N. Y., a corporation of Delaware Continuation of application Serial No. 487,145, May 15, 1943. This application October 28, 1947, Serial No. 782,653. In France February 9, 1940

Section 1, Public Law 690, August 8, 1946
Patent expires February 9, 1960

5 Claims. (Cl. 343—13)

One object of the present invention is that of providing means for the quantitative indication of the trajectory of a projectile such as a shell, particularly in connection with the control and regulation of artillery fire.

The invention also makes it possible to determine the bursting height of anti-aircraft projectiles.

According to one of its embodiments, this invention makes use of the measurement of the distance of shells or the like, by electromagnetic wave echoes from the projectile. The electromagnetic radiation that is used may be directional and be of a wave length that has a definite relation to the projectile's geometrical dimensions so that, for example, the projectile may enter into resonance with the received electromagnetic waves.

This application is a continuation of my previously filed application Serial No. 487,145, filed May 15, 1943, now abandoned.

This invention is explained with reference to the hereunto appended drawings, in which:

Fig. 2 illustrates schematically a transmitter and receiver according to one form of this invention;

Fig. 4 is a diagram for determination of power needed and optimum frequency.

Fig. 1 shows schematically at A an artillery gun and at O the objective to be hit, the terrain being assumed to be horizontal. The trajectory followed by the shell is indicated by S.

Figure 1:
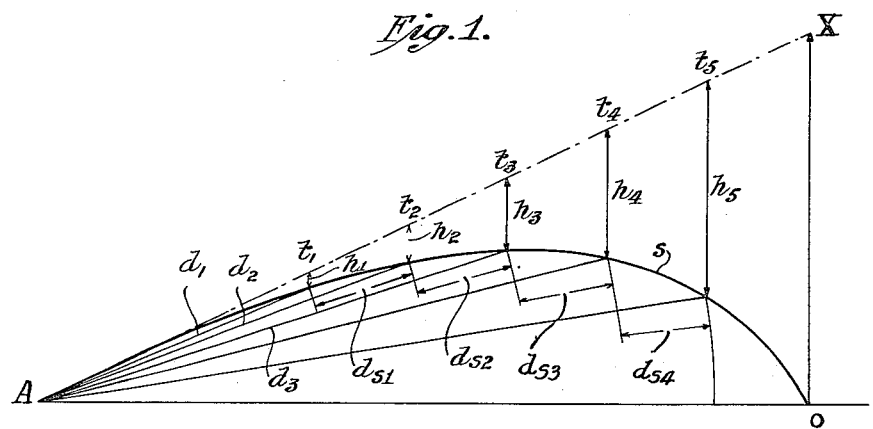
Fig. 1 illustrates various elements of the trajectory of a shell.

The devices provided by the present invention make it possible to determine at specified moments the distance of the shell from the gun A, i. e. the distances represented by $d1$, $d2$, $d3$, etc. in the drawing. In practice, the measurements may conveniently be made so as to indicate the variation in a given time interval of the distance, i. e. the elements $ds1$, $ds2$, $ds3$, etc., determined by arcs of circles having the center A and radii $d1$, $d2$, $d3$, etc. As hereafter shown, the results of the measurements will make it possible to determine with precision the shape of the trajectory, and, by extrapolation, the point of impact, O, of the shell.

At the moment when the shot is fired, an ultra short wave transmitting station is arranged so as to send an impulse having a duration that may last for one microsecond, for example. This impulse is reflected from the shell and is received by a receiving set located, for example, in the vicinity of the artillery gun A, and the corresponding distance is determined in a manner known in the art by the time interval that elapses between the transmitted impulse and the received echo thereof. Series of impulses may be transmitted at suitably selected time intervals and the corresponding echoes make it possible to determine at each of these moments the distances traveled by the shell after it leaves the gun A. It is thus possible to measure the distances $d1$, $d2$, $d3$, etc. traveled by the projectile during the known time intervals $t1$, $t2$, $t3$, etc. starting from the moment when the shell is fired from the gun. The result of these measurements gives substantially precise indications of the trajectory followed by the shell. As a matter of fact, the shell would follow the straight line indicated by AX (Fig. 1) if it did not undergo the effect of gravity after leaving the gun A. As a result of the effect of gravity, the shell has "fallen" by a height $h1$ at the time $t1$, by a height $h2$ at the time $t2$, by a height $h3$ at the time $t3$, etc. By means of the result of the measurements of the distances $d1$, $d2$, $d3$, etc. at the known time moments $t1$, $t2$, $t3$, etc. that correspond to the vertical linear extents of fall $h1$, $h2$, $h3$, etc. it is possible by ballistic computations to find the course of the trajectory S followed by the shell and, by extrapolation, to determine approximately the point of impact of the shell.

Owing to the obstacles that are present on the surface of the ground and to variations of the terrain, it is not possible as a rule to follow the projectile until it falls, but the information furnished by the hereinafter described devices makes it possible to determine this point of fall with sufficient precision.

Fig. 2 illustrates schematically one embodiment of this invention, comprising an ultra high frequency impulse transmitter 1, which is connected to a group of directional antennae shown schematically at 2. The impulses thus transmitted are reflected from the shell and the corresponding electromagnetic echoes are picked up by a receiver 3 which may be associated with another group of antennae for this reception, or else may be connected with the same group of antennae 2, as shown in Fig. 2 of the drawings. In case use is made of a single group of antennae 2 for transmitting the impulses and for receiving the corresponding echoes, it is necessary to provide a mechanical or electronic switching device 8, controlled by an impulse generator 4. This same impulse generator 4 modulates the transmitter 1 and likewise determines the saw-tooth type scanning of the time base producing device 5 of a cathode ray receiving device 6. Scanning waves from the saw-tooth generating device 5 are applied to one set of deflecting plates of the cathode ray tube 6 and the pulses from the receiver 3 are applied to the other set of deflecting plates in well-known manner. The cathode ray tube 6 may be optically coupled to a photographic device 7, the purpose of which will be explained further on. Suitable power supply circuits 10, 11 and 12 are provided for the various elements of the assembly, to which they are respectively shown as connected, in the drawings.

Impulse generators of the kind indicated by the block 4 are well-known in the art and are disclosed for example in United States Patent No. 2,266,401 to A. H. Reeves The arrangement and construction of the saw-tooth wave generators such as 5, which are synchronized by impulses as from a pulse generator 4 are also well-known and require no detailed description.

Although it is necessary that the indication due to the transmitted impulse appears on the screen of the cathode ray tube, the path from the antenna to the receiver must be substantially blocked during the transmission of impulses as otherwise the receiver will be damaged. The device 8 comprises preferably well-known electronic tube devices for substantially blocking the receiver path when impulses are transmitted and for substantially blocking the transmitter path during intervals between impulses. Such devices may comprise electron tubes which are alternately blocked and unblocked by voltages derived from the impulse generator 4 and applied to the control grids of the tubes. The use of such electron tube devices is well-known in the radio art in connection with combined transmitting and receiving systems and is disclosed for example in Patent No. 1,975,270 issued October 2, 1934, or No. 2,199,179 of April 30, 1940. Such an electronic blocking device will pass a small quantity of a transmitted impulse energy sufficient to provide an indication on the screen of the cathode ray tube 6 but not sufficient to cause damage to the receiver.

Figure 3:
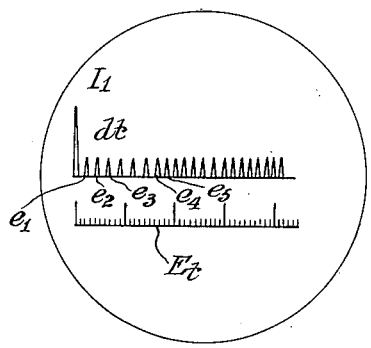
Fig. 3 shows the screen of the indicating oscillograph of Fig. 2.

Fig. 3 shows the screen of the oscillograph on which the transmitted impulse $I_1$ and the corresponding echoes $e_1$, $e_2$, $e_3$ etc. appear.

The selection of the impulses and of their frequency may be based on the following considerations:

In order to obtain sufficient precision, the duration of the impulses has to be very short, e. g. of the order of magnitude of one microsecond, and their shape has to be stable so that the impulse returned by the projectile with a certain deformation will still continue to retain the same deformation. This is due to the fact that the projectile behaves like a damped resonator. Since the projectiles are made so as to have precise dimensions, determination is to be made once for all of that point of the registered impulse at which the measurement is to be made (start of the impulse, or its maximum).

Since the velocity of projectiles during the latter part of their travel is of the order of magnitude of a few hundreds of meters per second or less, the frequency of emission of the peaks does not need to be high, and it may be made about 100 per second This frequency determines the space interval between two successive positions of the projectile, and it chiefly depends on the method used for registering. In case the frequency of emission of the peaks is very great, visual observation will show a peak shifting on the distance base of the oscillograph (Fig. 3) as a function of the time with little or no separation between successive peaks. The recording may be done by means of a moving picture camera, indicated schematically at 7, the film of which, operated at the usual speed, will when processed show the successive positions of the projectile as a function of the time from the moment when it leaves the gun since if the speed of the camera is known, it will be easy to compute the time intervals represented by echo pulse indications on successive frames. The start of the projectile may also determine the initiation of operation of this moving picture camera. For example by means of a mechanical coupling the firing mechanism of the gun may start the motor of the camera.

In case the frequency of emission of the peaks is low, it is possible to expose a photograph for the entire time during which the projectile is in the trajectory it follows. The successive impulses or peaks that are received will range themselves along-side each other as shown in Fig. 3 if the interval between such peaks has been properly selected.

Each received peak determines with precision the time that has elapsed, so that it may even be possible to dispense with the usual time or distance scale, consisting of very short peaks regularly distributed in time.

However, as it might be a long task to count all the received peaks, it will be found suitable to use a time scale $E_t$ (Fig. 3) which specially indicates every 50th or 100th or $n$th peak.

If it is desired to have additional information regarding the shape of the trajectory toward the point of impact, vertical and horizontal angle gauging of the position of the projectile may be made. This angle gauging in the vertical plane may be based on the use of antenna systems of well-known type having directional patterns having a large number of lobes separated by regularly distributed nulls or directions of zero radiation. Passage of the projectile through these directions of zero radiation will make it possible to determine its position angle over a series of well determined points of its trajectory. It will be found suitable to position one of the zones of zero radiation marked in advance in correspondence with the firing angle of the gun.

In the horizontal plane, all that has to be done is to employ a directional antenna system of well-known type having two intersecting radiation diagrams and to arrange the axis of intersection of two directional diagrams to coincide with the direction of the firing in order to determine whether the projectile really keeps to the intended trajectory.

This apparatus furthermore furnishes a very precise indication of the velocity of the projectile as it leaves the gun.

Furthermore, it is preferable to use waves that are shorter than twice the length of the projectile, and it has been found convenient to use the wave lengths:

$$L\frac{L}{2}, \frac{L}{3}, \frac{L}{4}, \text{etc.}$$

L being the length of the projectile.

Vertical polarization is preferably adopted when the ascertaining of the trajectory is to be done from the gun site, itself.

This ascertaining may even be made laterally, and this method may be suitable for determining the velocity of the projectile as it leaves the gun. Horizontal polarization will as a rule be preferable in this latter case. This method makes it possible to determine the bursting height of an anti-aircraft projectile, since the disappearance of the corresponding echoes will correspond to the precise point of explosion of the projectile.

It likewise is possible that the projectile may be equipped with a receiver-transmitter which will reinforce the return peaks.

The projectile may also be adapted to emit damped oscillations of a few centimeters or decimeters in length which can be angle gauged by means of two cathode ray oscillograph type instantaneous radio direction finders synchronized in such a way that the bearings taken by each of them may be compared as a function of the time.

The power of the electromagnetic radiation to be employed and also the length of the optimum wave may be determined by referring to Fig. 4 of the appended drawings. In this Fig. 4 the angular deviations noted on an ultra short wave radio direction finder R are shown as ordinates, and as abscissae are shown the displacements D in wavelengths of a tuned reflector doublet, the movement of which in the plane of the figure is shown at $d$. This Fig. 4 applies to the case of a homogeneous or uniform field whose wave front F may be considered as plane. P indicates the direction of transmission of the remote transmitter. As will be readily appreciated as the distance D between the reflector doublet and the direction finder R is increased the reflecting effect of the doublet and the apparent direction vary, and the deviation indicated by the direction finder D and shown by the curve may be considered as a measure of the field due to the reflector doublet.

At a distance of for example four wavelengths, the deviation is approximately 2° and the field due to the doublet antenna which acts as a reflector is therefore equal to about 3.5% of the principal field, and this figure characterizes the efficiency of the reflection and of the transmission. By known laws of the art, this field at a distance of $1000\lambda$ is:

$$\frac{0.035 \times 4}{1000} = 0.00014 \text{ of the principal field}$$

At $10,000\lambda$, and still considering the transmitter to be located at infinite distance, the secondary field is 0.000,014, i. e. 71,500 times weaker than the principal field (97 db.).

At $100,000\lambda$ we get 0.000,001,4; i. e. 117 db.

If these results are applied to investigation of the case of the secondary radiation of a projectile of half a wave in length, one can deduce from them the order of magnitude of the power required for getting the return of a field sufficient for a radio receiver. If it be desired to have a field of 10 microvolts per meter at the receiving end, the projectile will consequently have to be in a field of 0.715 volt per meter at a distance of $10,000\lambda$.

If the projectile is one meter in length, the wave length can be taken as 2 meters and the $10,000\lambda$ distance will then be 20 km.

A further consideration is the inclination of the projectile. The coefficient of reduction of the secondary radiation due to the inclination of the projectile to the horizontal is 0.5 for 45° and 0.25 for 30°. This coefficient is the square sine of the angle. The power will consequently have to be increased for this reason.

In a plane wave, the relation between the electric field per unit of length and the power corresponding to each unit of surface is:

$$E_{volts} = \sqrt{120 \pi P_{watts}}$$

For a field of 0.715 volt per meter, the power per square meter is accordingly:

$$P = \frac{E^2}{120} = 0.00136 \text{ watt}$$

The total corresponding power over a sphere of 20,000 meters in radius is:

0.00136 w. $\times$ 5000·$10^{6m.^2}$ = 6,800,000 watts i. e. 6,800 kilowatts.

Since the energy is concentrated by directional antennae over a surface of about 36 km.$^2$ at 20 km., i. e. 139 times less, the power required is:

$$\frac{6800 \text{ kw.}}{139} = 49 \text{ kw.}$$

The reception directional antennae will make it possible to save a ratio of about 5 at the receiving end, i. e. will allow $1/25$ of the power to suffice. The transmitted power accordingly becomes:

$$\frac{49 \text{ kw.}}{25} = 1.96 \text{ kw.}$$

In order to allow for the inclination of the projectile, it would be necessary to multiply the remote field by a factor of 2 or 4 as previously explained. It must however be observed that a field has been provided of sufficient strength for the receiving actuation, (10 microvolts per meter) and that this coefficient of 2 or 4 may be taken from the received field, while still allowing good reception.

It may accordingly be concluded that with available peak powers of 2 to 10 kw. it is possible to establish a system for controlling and regulating the fire of projectiles of the size 1 meter, to a distance of 20 km., at least.

It can readily be seen that the invention can be applied to projectiles shorter or longer than the usual sizes.

The invention is capable of many variations and adaptions. For example, it is possible to use indicating instruments different from those above given as examples, and other possible variations will be apparent to those skilled in the art.

What is claimed is:

1. In a system for determining projectile trajactories by means of radio wave echoes an indicating device including an antenna, a transmitter for transmitting radio waves of a wavelength to be reflected by said projectile, a receiver, switching means for connecting said antenna alternately to said transmitter and said receiver, a cathode ray oscillograph connected to said receiver, a time-base sweep circuit generator connected to said oscillograph, and an impulse generator connected to, and acting to synchronize said switching means, said transmitter, and said sweep circuit generator, respectively, said device also including suitable sources of power for the respective elements thereof and a motion picture camera optically coupled to the screen of said oscillograph.

2. In a method for determining the distance of a projectile along its trajectory at spaced intervals during its flight, the steps comprising radiating a pulse of radio waves simultaneously with the firing of said projectile and at regular intervals thereafter, the interval between pulses being a small fraction of the time of flight of said projectile, and the wavelength of said waves being not greater than the length of said projectile whereby waves are reflected from said projectile back to the point of transmission, receiving said reflected wave pulses, and producing indications of the transit time of each received pulse.

3. In a method for determining the distance of a projectile along its trajectory at spaced intervals during its flight, the steps comprising radiating a pulse of radio waves simultaneously with the firing of said projectile and at regular intervals thereafter during the flight of said projectile, at a recurrence frequency of the order of 100 pulses per second, said waves being of a wave length less than twice the length of said projectile, receiving the wave pulses reflected from said projectile, and producing an indication of each received pulse, and spacing each indication from a reference point by a distance corresponding to the transit time of the received pulse.

4. A method including the steps recited in claim 3 wherein said radio waves have a frequency corresponding to a resonant frequency inherent in the physical structure of said projectile.

5. The method of determining the trajectory of a projectile which includes the steps of transmitting a radio impulse simultaneously with the firing of said projectile and at intervals thereafter during the flight of said projectile, reflecting said impulses from said projectile back to the point of transmission, establishing a time base beginning with the firing of said projectile, receiving the echoes reflected from said projectile during its flight, and producing an indication on said time base upon receipt of each echo.

HENRI GASTON BUSIGNIES.

REFERENCES CITED

The following references are of record in the file of this patent:

UNITED STATES PATENTS

| Number | Name | Date |
| --- | --- | --- |
| 1,975,270 | Hansell | Oct. 2, 1934 |
| 2,189,549 | Hershberger | Feb. 6, 1940 |
| 2,199,179 | Koch | Apr. 30, 1940 |
| 2,227,598 | Lyman | Jan. 7, 1941 |
| 2,280,226 | Firestone | Apr. 21, 1942 |
| 2,323,534 | Goddard | July 6, 1943 |
| 2,401,717 | Wolff | June 4, 1946 |
| 2,409,462 | Zworykin | Oct. 15, 1946 |
| 2,419,205 | Feldman | Apr. 22, 1947 |
| 2,433,838 | Elie | Jan. 6, 1948 |

FOREIGN PATENTS

| Number | Country | Date |
| --- | --- | --- |
| 853,994 | France | Dec. 23, 1939 |
| 111,594 | Australia | Mar. 19, 1939 |
| 108,556 | Australia | Sept. 14, 1939 |
| 113,233 | Australia | June 2, 1941 |